Dec. 27, 1955     H. L. POTTER     2,728,616
BEARING
Filed Nov. 24, 1953
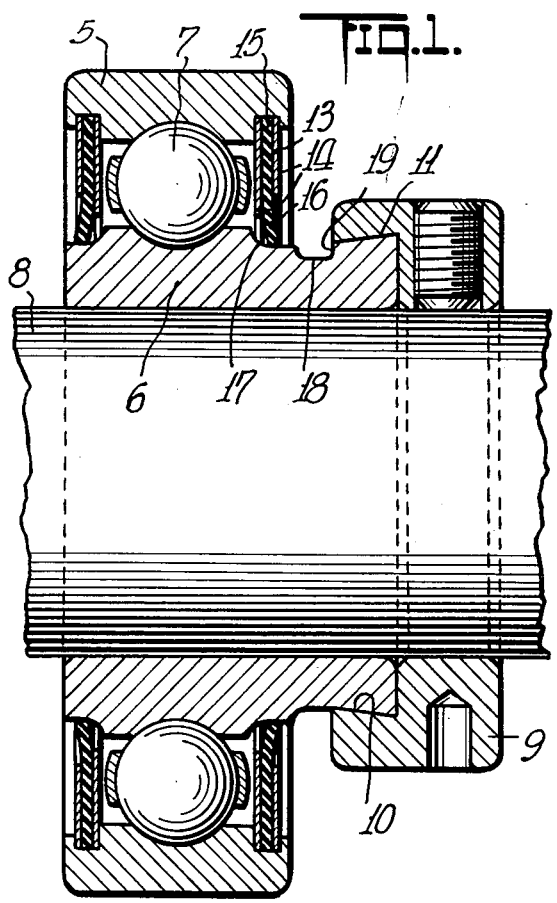
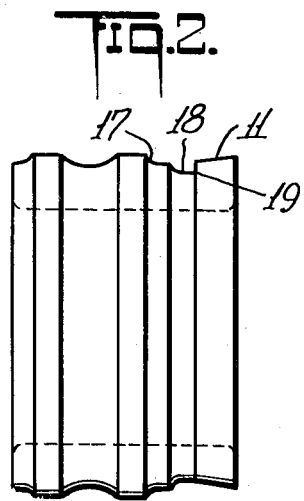
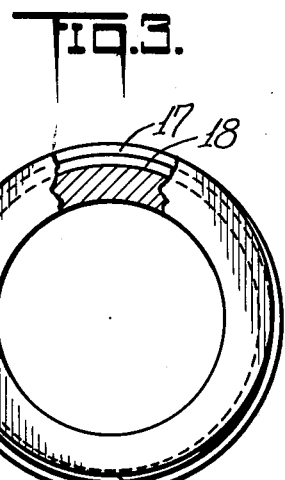
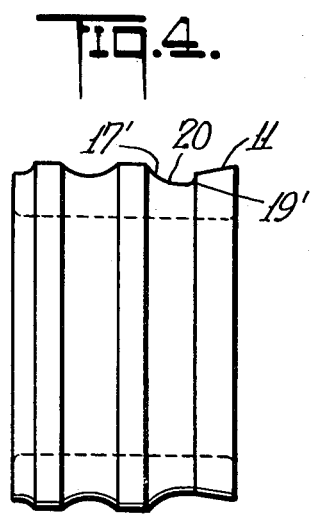
INVENTOR.
Howell L. Potter
BY Mitchell Bechert
ATTORNEYS

United States Patent Office 2,728,616
Patented Dec. 27, 1955

2,728,616

BEARING

Howell L. Potter, New Britain, Conn., assignor to The Fafnir Bearing Company, New Britain, Conn., a corporation of Connecticut Application November 24, 1953, Serial No. 394,024

2 Claims. (Cl. 308—187.2)

My invention relates to an antifriction bearing and more particularly to sealing means and means for removing the bearing from a shaft.

Antifriction bearings are often provided with seals to seal in lubricants and exclude foreign matter, and such seals often will run on a bearing surface on the inner bearing ring, which bearing surface may be a part of a groove cut in the outer surface of the inner ring. The inner ring often rusts tight on a shaft, and it is difficult to remove it when the bearing is in such a position that a drift or other driving device cannot be applied in the proper direction. In such cases it is desirable to apply a puller to the inner ring to pull the same off the shaft in the direction desired. A puller is often applied to an inner ring beyond a shoulder so as to provide abutment means for a straight pull on the ring. Since such a shoulder often forms one side of a groove, and since the bearing seal often contacts a part of a groove, I provide, in effect, a single groove one side of which serves as a bearing surface for a contact seal, while the exposed side serves as a shoulder or abutment for engagement by a bearing puller, which later may be applied to pull the bearing from a shaft.

It is an object of the invention to provide an antifriction bearing having improved seal and bearing puller means.

It is another object to provide a bearing having a contact surface for a seal and for a bearing puller, so arranged that they may be readily formed in a single turning operation.

Another object is to provide an antifriction bearing with a combined seal and bearing puller groove.

In the drawings which show, for illustrative purposes only, preferred forms of the invention—

Fig. 1 is a view in central radial section through a ball bearing illustrating the invention;

Fig. 2 is a detail view on a reduced scale of the inner ring shown in Fig. 1;

Fig. 3 is a view in right-hand elevation of the inner ring shown in Fig. 2;

Fig. 4 is a view of an inner ring like that shown in Fig. 2, but illustrating a slight modification.

The bearing shown in the illustrated example includes an outer bearing ring 5, and an inner ring 6 with interposed antifriction bearing members such as balls 7, which run in the usual raceway grooves. In the preferred form illustrated, the inner ring is held on the shaft 8 by means of an eccentric locking collar 9, which has a bore to fit the shaft, and which has an eccentric counterbore 10 in one end face thereof. This counterbore is designed to fit an eccentric cam surface 11 formed on the end of the inner bearing ring 6. The eccentric surfaces 10—11 are designed to fit each other, and when both are in place on a shaft, the inner ring is locked in place simply by relatively rotating the inner ring and the locking collar 9. A set screw or the like may be employed for holding the locking collar and inner ring against axial movement on the shaft, and also for holding the locking collar against rotation so that the collar and inner ring may be rotated readily relatively to each other. Such eccentric locking collar means are well known in the art at this time.

In order to seal the bearing, I preferably provide a seal which may consist of a rubber or like seal washer 13, sandwiched between two annular discs or caps 14, all of which fit in a groove 15 in the outer ring. In the particular form illustrated, the seal washer 13 is freely flexible at its inner annular edge; that is to say, the stiffening caps 14 preferably extend only part way to the inner ring so as to permit free flexing of the free edge 16 of the seal. The seal 16 engages a generally axially and radially outwardly facing surface 17 on the inner ring, and in the form illustrated, such surface is one side of a groove so that the flexible inner edge of the seal may lightly engage and hold against the arcuate surface, as will be understood. Duplicate seals may be employed at opposite sides of the bearing, so as to completely seal the same.

When it is desired to pull the inner ring from a shaft, it is necessary to have some means for engagement by a bearing puller, and it is preferred to have a substantial generally radially extending abutment surface for such engagement. As illustrated, inwardly of the edge of the eccentric cam surface 11, I provide a groove 18 providing a generally radial abutment surface 19 at the outer edge of the groove. Both the grooves 17 and 18 are concentric with the inner ring and, while I have referred to these grooves as separate grooves, they are, in effect, a single groove and are not separate or discrete.

It will be seen that since the locking or cam surface 11 is eccentric that the abutment shoulder 19 will not always extend completely around the inner ring, but does extend sufficiently to provide a substantial surface for engagement by a bearing puller. Such a bearing puller may be of the type shown in my copending application Serial No. 288,073, filed May 15, 1952.

As stated above, the grooves 17—18 need not be separate distinct grooves and, in fact, are a single groove, as shown in both Fig. 1 and Fig. 4. In the slight modification in Fig. 4 the two grooves are merged into a single continuously curved groove 20, the right-hand side of which forms the abutment surface 19', while the left-hand surface provides a suitable bearing surface 17' for the seal washer 16. It will be seen that, with the two grooves merged as in either Fig. 1 or Fig. 4, a relatively wide and sturdy form tool may be employed for forming the groove, which tool is not likely to break or chip and, therefore, the combination groove may be very readily and cheaply formed.

It will be seen that I have provided an antifriction bearing with a combined bearing seal and puller surface, which will be highly effective in use, and which is relatively cheap and simple to manufacture.

The bearing may be readily and securely sealed and the bearing may be very readily pulled from the shaft by a suitable bearing puller, all because of the combination seal and puller groove.

While the invention has been described in considerable detail and preferred forms illustrated, it is to be understood that various modifications may be made within the scope of the invention as defined in the appended claims.

I claim:

1. In an antifriction bearing comprising inner and outer bearing rings with interposed antifriction bearing members, said inner ring extending beyond said outer ring at one end, said inner ring at said one end having a concentric groove in part arcuate in cross-section extending around said inner ring, said groove at an arcuate part extending at one axial end substantially to the outer diameter of said inner ring and terminating at the other axial end in a generally radial shoulder, a bearing seal carried by said outer ring and having a generally flexible inner edge for resilient contact with an arcuate part of said groove.

2. In an antifriction bearing comprising inner and outer bearing rings with interposed antifriction bearing members, said inner ring extending beyond said outer ring at one end, said inner ring at said one end having a circumferentially extending eccentric locking cam, said inner ring axially inwardly of said eccentric locking cam having a concentric groove therein arcuate in cross section at one axial side, a bearing seal carried by said outer ring and lightly contacting one side of said groove, the other side of said groove terminating in a generally radial shoulder for engagement by a puller tool.

References Cited in the file of this patent

UNITED STATES PATENTS

| | | |
|---|---|---|
| 1,889,064 | Dunham | Nov. 29, 1932 |
| 2,655,393 | Cobb | Oct. 13, 1953 |

FOREIGN PATENTS

| | | |
|---|---|---|
| 622,418 | Great Britain | May 2, 1949 |